United States Patent [19]

Shao et al.

[11] Patent Number: 5,834,644
[45] Date of Patent: Nov. 10, 1998

[54] AUTOMATIC ATOMIC FORCE MICROSCOPE WITH PIEZOTUBE SCANNER

[75] Inventors: Zhifeng Shao; Jian Xun Mou; Gang Huang, all of Charlottesville, Va.

[73] Assignee: The University of Virginia Patent Foundation, Charlottesville, Va.

[21] Appl. No.: 748,635

[22] Filed: Nov. 13, 1996

Related U.S. Application Data

[60] Provisional application No. 60/006,648, Nov. 13, 1995.

[51] Int. Cl.$^6$ ................................................. G01B 11/30
[52] U.S. Cl. ............................................ 73/105; 310/365
[58] Field of Search ............................ 73/105; 310/365; 250/306, 307

[56] References Cited

U.S. PATENT DOCUMENTS

| | | | |
|---|---|---|---|
| 5,144,833 | 9/1992 | Amer et al. ................................ | 73/105 |
| 5,260,824 | 11/1993 | Okada et al. ........................... | 73/105 X |
| 5,319,960 | 6/1994 | Gamble et al. ............................ | 73/105 |
| 5,408,094 | 4/1995 | Kajimura et al. ................... | 250/306 X |
| 5,448,399 | 9/1995 | Park et al. ............................... | 359/372 |
| 5,469,733 | 11/1995 | Yasue et al. ............................... | 73/105 |
| 5,506,400 | 4/1996 | Honma et al. .......................... | 250/205 |
| 5,574,218 | 11/1996 | Poirier ..................................... | 250/306 |
| 5,616,916 | 4/1997 | Handa et al. ............................ | 250/234 |
| 5,656,769 | 8/1997 | Nakano et al. ............................ | 73/105 |
| 5,689,063 | 11/1997 | Fujiu et al. ............................... | 73/105 |

OTHER PUBLICATIONS

Patent Abstracts of Europe (DE 04233399A1) Apr. 7, 1994 "Force Microscope with Contilcuered Point and deflection photodector——microscope".

Patent Abstract of Japan (07–12545) Jan. 17, 1995 "Interatomic–Force–Microscope Detection Apparatus by Differential Heterodgne Interterometer Using Optical–Fiber Array".

Primary Examiner—Thomas P. Noland
Attorney, Agent, or Firm—Oblon, Spivak, McClelland, Maier & Neustadt, P.C.

[57] ABSTRACT

An atomic force microscope which can provide an automatic operation of focusing a laser beam onto a cantilever of the atomic force microscope, and which can ensure that a laser beam reflected off this cantilever is properly directed to a detector. A tip supported by the cantilever can also be automatically and properly lowered to a specimen. A piezotube scanner within such an atomic force microscope is also provided to prevent any damage from occurring if any leakage of an aqueous solution containing the specimen occurs.

10 Claims, 12 Drawing Sheets

AUTOMATIC ATOMIC FORCE MICROSCOPE WITH PIEZOTUBE SCANNER

This invention was made with Government support under Contract Numbers NSF BIR 9115655 (Shao) and NIH R01 RR07720 (Shao) awarded by the National Science Foundation and the National Institutes of Health, respectively. This Government has certain rights in this invention.

PRIORITY BENEFIT CLAIM

The present invention is a non-provisional application which claims priority on provisional application 60-006,648 filed Nov. 13, 1995.

BACKGROUND OF THE INVENTION

1. Field of the Invention

The present invention is directed to an atomic force microscope with an automatic operation and with an improved piezotube scanner.

2. Discussion of the Background

An atomic force microscope (AFM) has been proven to be a powerful instrument in the elucidation of macromolecular structures, e.g., determining a topology of a structure. A significant advantage of such an AFM is its ability to image biological structures in an aqueous environment which cannot be achieved by most other experimental techniques at a similar resolution. Under physiological conditions, many biological samples, such as nucleic acids, phospholipid bilayers, soluble proteins and membrane proteins have been successfully imaged with excellent reproducibility and high spatial resolution, with the best resolution being in the range of 1–2 nm.

However, despite continued development in instrumentation, imaging biological samples in aqueous buffers remains a difficult undertaking in practice, particularly if high resolution is required, even when a stable and clean specimen has been prepared. Among the difficulties, in addition to specimen preparatory techniques and probe induced specimen deformation/movement, the alignment of a laser beam in the AFM through a thick transparent cover, mostly made of plastic, which holds a cantilever in place and seals a solution inside a fluid cell in an initial approach for tip engagement is prone to human operator errors. Very often, these mistakes are not recognized immediately, leading to artifacts and unnecessarily prolonged experiments.

The background atomic force microscope operates such that a laser beam impinges on an edge or tip of the cantilever and a reflection of this laser beam is detected. In one operation, changes in this reflection of the laser beam are utilized to form a topographical image of the specimen. In the background atomic force microscope devices, an operator must manually adjust the laser beam to properly impinge on and thereby reflect off of the edge or tip of the cantilever. This adjustment requires skill on the part of the operator as this adjustment is performed manually. As a result, it is often very difficult and time consuming for an operator to align such a laser beam onto the cantilever.

As one solution to this problem a lower power light microscope can be mounted on the atomic force microscope to assist the operator in properly aligning the laser beam onto the cantilever.

However, such background atomic force microscopes suffer from the drawback that if they are to be used in a temperature controlled, sealed and/or dark environment, it may not be possible to mount such a lower power light microscope thereon. Also, such a temperature controlled, sealed and/or dark environment may require the operator to be positioned a certain distance away from the atomic force microscope, which may also make the manual adjustments required in the background atomic force microscope more difficult.

Moreover, in a background atomic force microscope, after the laser beam is properly focused on the cantilever, the speciman tip must be positioned to a surface of a specimen within 100 microns or less. In a background atomic force microscope, this adjustment is also performed manually by an operator. That is, in the background atomic force microscope, a cantilever holds the tip in a head of the atomic force microscope. This cantilever with the tip is manually lowered by an operator until the tip is with in 100 microns or less from a surface of a specimen. If the cantilever is lowered too quickly, the tip will contact the specimen with an excessive force, which may thereby damage both the specimen and the tip; this situation is often referred to as a "tip crash". One significant drawback in such background atomic force microscopes is that an operator must be extremely experienced to properly lower the tip to the specimen to avoid a tip crash.

Further, in lowering the tip to the specimen, the head of the atomic force microscope must be maintained to be level. This requirement further taxes the operator.

The background atomic force microscopes also mount a specimen on a piezotube scanner. Such a piezotube scanner is typically structured to have four outer 90° cylindrical section electrodes which are applied with a high voltage for x, y scanning, and a single inner electrode which is applied with a high voltage for z movement. In this background piezotube scanner, the piezotube scanner can be controlled to change positions in X, Y and Z directions by manipulation of the voltages applied to the four outer 90° cylindrical section electrodes and the one inner electrode. However, the drawback with such a background piezotube scanner is that the outer electrodes have a high voltage applied thereto. In a situation in which a specimen to be examined is in an aqueous solution, if there is any leakage of the aqueous solution, such leakage may contact the high voltage outer electrodes of the piezotube scanner, and thereby short out the piezotube scanner, often resulting in permanent damage to the piezotube scanner.

SUMMARY OF THE INVENTION

Accordingly, one object of the present invention is to provide a novel atomic force microscope which can overcome the drawbacks in the background art.

A more particular objective of the present invention is to provide a novel atomic force microscope which is ideally suited for operation on a specimen in solution, and which is also suitable for operation in a dark, sealed, vacuum and/or temperature controlled chamber. Temperature control is often desirable for biological experiments, because many macromolecular structures and assemblies are temperature sensitive.

The atomic force microscope of the present invention provides a simplified structure and operation in which tip crashing can be largely avoided and in which an image of a specimen in solution can be achieved with ease at a high resolution. Such benefits of the present invention facilitate application of the atomic force microscope of the present invention in biological research with a reduced demand on operator skills.

The atomic force microscope of the present invention further provides a novel piezotube scanner structure in which there are no detrimental results if a solution containing a specimen has any leakage.

In one feature, the novel atomic force microscope of the present invention provides control operations so that a laser beam is automatically properly aligned on a cantilever element, and a tip element is automatically and properly lowered toward contact with a specimen, in such a way that a tip crash can be avoided and such that the cantilever remains level while the tip is lowered.

As another feature of the present invention, a novel piezotube scanner can be sealed in such a way to prevent any leakage of a solution which contains a specimen from contacting an outer electrode thereof, to thereby avoid damage to the piezotube scanner.

As a further feature of the present invention, a novel piezotube scanner can be implemented with a novel electrode structure such that an outer electrode is grounded, so that if such an outer electrode does come in contact with a solution which has leaked, the piezotube scanner is not damaged.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 3(a)–3(D) show schematic views of control devices according to the present invention;

FIGS. (5a) and (5b) show a control operation in the present invention;

FIGS. 10(a)–10(c) show results achieved with the atomic force microscope according to the present invention.

DESCRIPTION OF THE PREFERRED EMBODIMENTS

Figure 1:
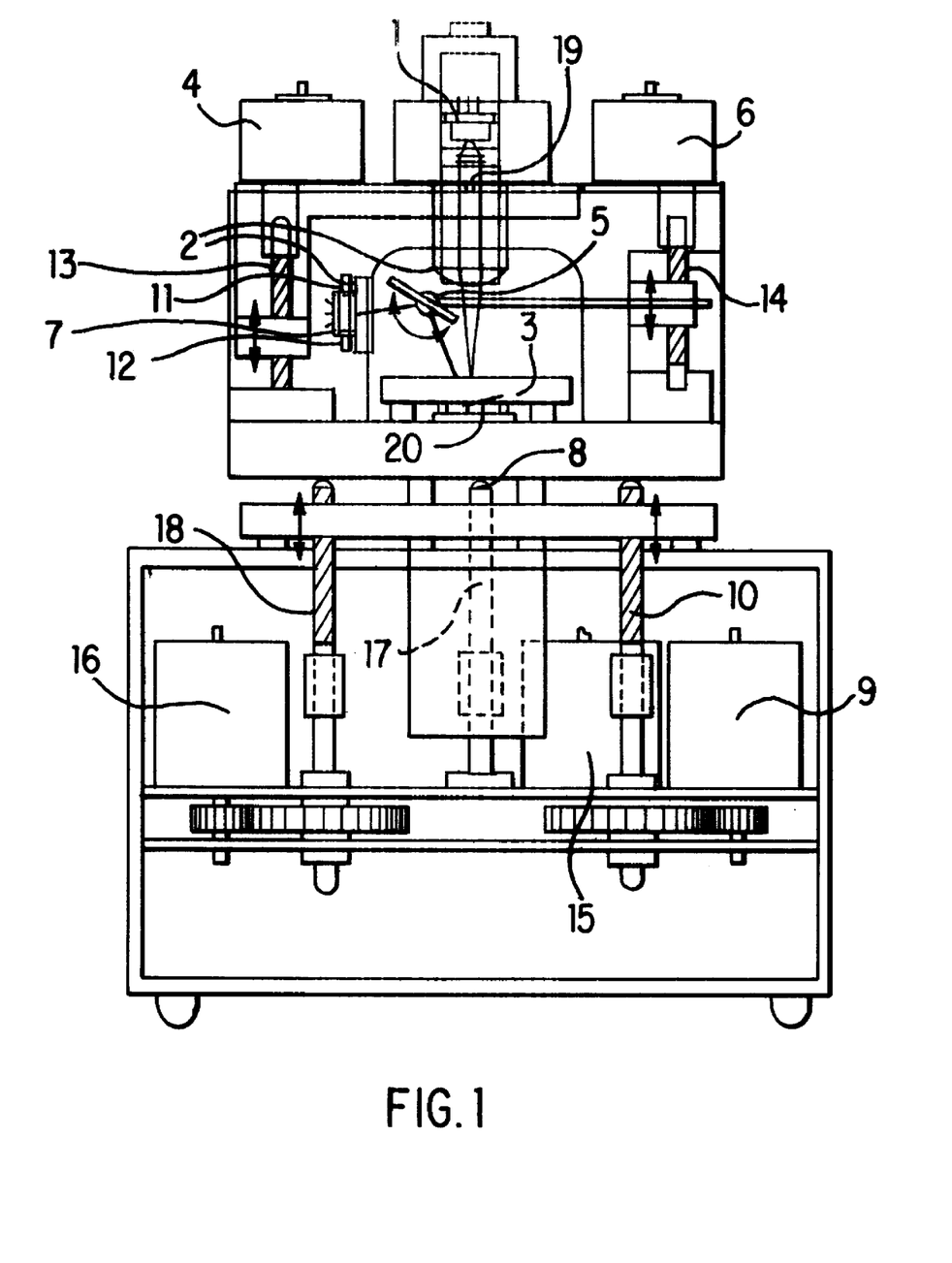
FIG. 1 shows an embodiment of an atomic force microscope according to the present invention.

Referring now to the drawings, wherein like reference numerals designate identical or corresponding parts throughout the several views, an embodiment of the atomic force microscope of the present invention as shown in FIG. 1 will now be discussed.

As shown in FIG. 1, an atomic force microscope according to the present invention includes a laser beam source 1 which generates a laser beam which then passes through a cylindrical lens 2 to be formed as a fine line laser beam. The fine line laser beam then impinges on a cantilever 3 which supports a speciman tip 20.

A first stepper motor 4 is provided to adjust a tilt of the laser beam generator 1 about pivot point 19. That is, when first stepper motor 4 is driven, this causes screw 13 to be rotated, i.e., to move up and down as shown by the arrows adjacent to screw 13. As a result of this movement of screw 13, the laser source 1 pivots about pivot point 19. This thereby results in the generated line laser beam essentially sweeping across the cantilever 3.

Further, a rotating mirror 5 is provided to reflect the laser beam which reflects off the cantilever 3, to fixed detector elements 7, 11, 12, e.g. photodetectors. A second stepper motor 6 controls the rotation of the rotating mirror 5. That is, the second stepper motor 6 controls screw 14 to be rotated, to thereby move up and down as indicated by the arrows adjacent to screw 14. The rotating mirror 5 is fixed about a pivot point at a center thereof, so that when the screw 14 is rotated to move up and down, the angle of mirror 5 thereby rotates. This rotation of the rotating mirror 5 thereby results in changing an angle of the line laser beam which reflects off the cantilever 3 toward the detector elements 7, 11, 12.

In the operation of the present invention, a line laser beam generated by the laser beam source 1 and cylindrical lens 2 when properly aligned onto the cantilever 3 reflects off the cantilever 3 towards rotating mirror 5. This fine line laser beam then reflects off rotating mirror 5 towards detector elements 7, 11, 12. Detector 7 is, for example, a high sensitivity two-element photodetector, and is flanked on both sides by single element photodetectors 11, 12. Detector 7 may be a split photodiode with an upper detector portion A and a lower detector portion 8, see also FIG. 5, which respectively output signals Sa, Sb. Detector 11 is positioned upper to detector 7, and outputs signal Su, and detector 12 is positioned down from detector 7, and outputs signal Sd. In the present invention these signals Sa, Sb, Su, Sd are processed in a processor 125, see FIG. 2, to provide the following three output signals Sa+b=Sa+Sb, Sa−b=(Sa−Sb)/(Sa+Sb) and St=Sa+Sb+Su+Sd. These signals are used in control operations of the present invention as further discussed below.

Figure 2:
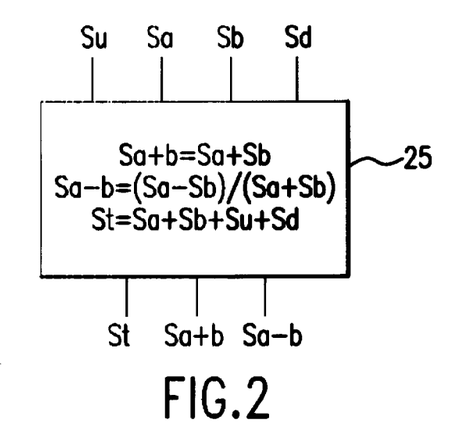
FIG. 2 shows a structure of a first control device of the present invention.
Figure 3A:
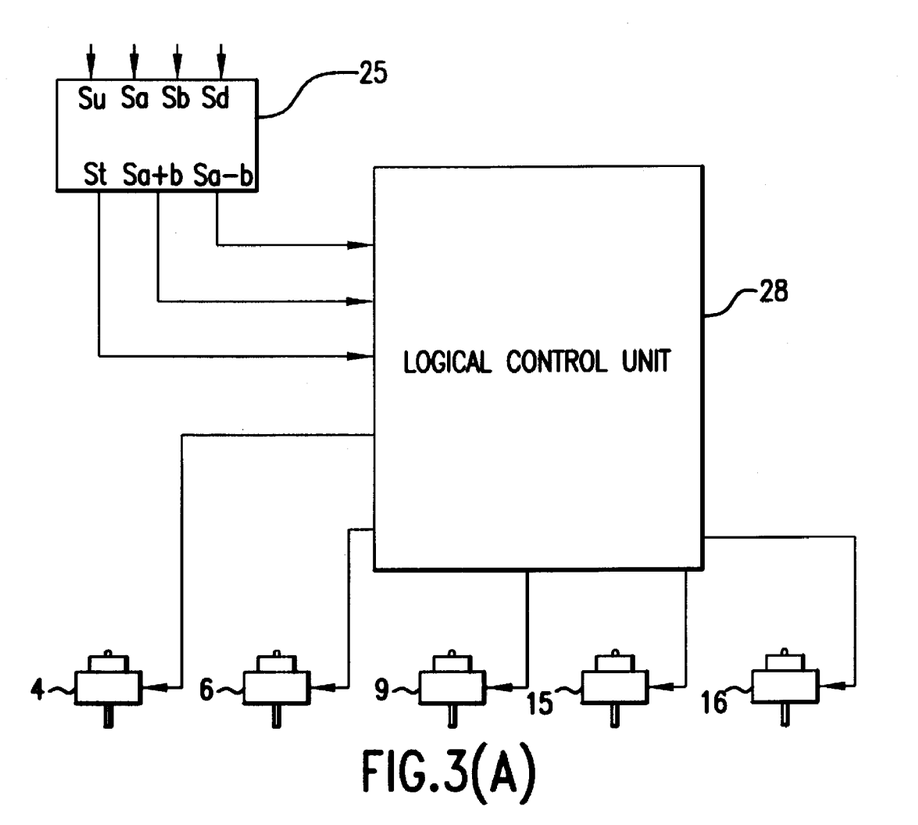
Figure 3B:
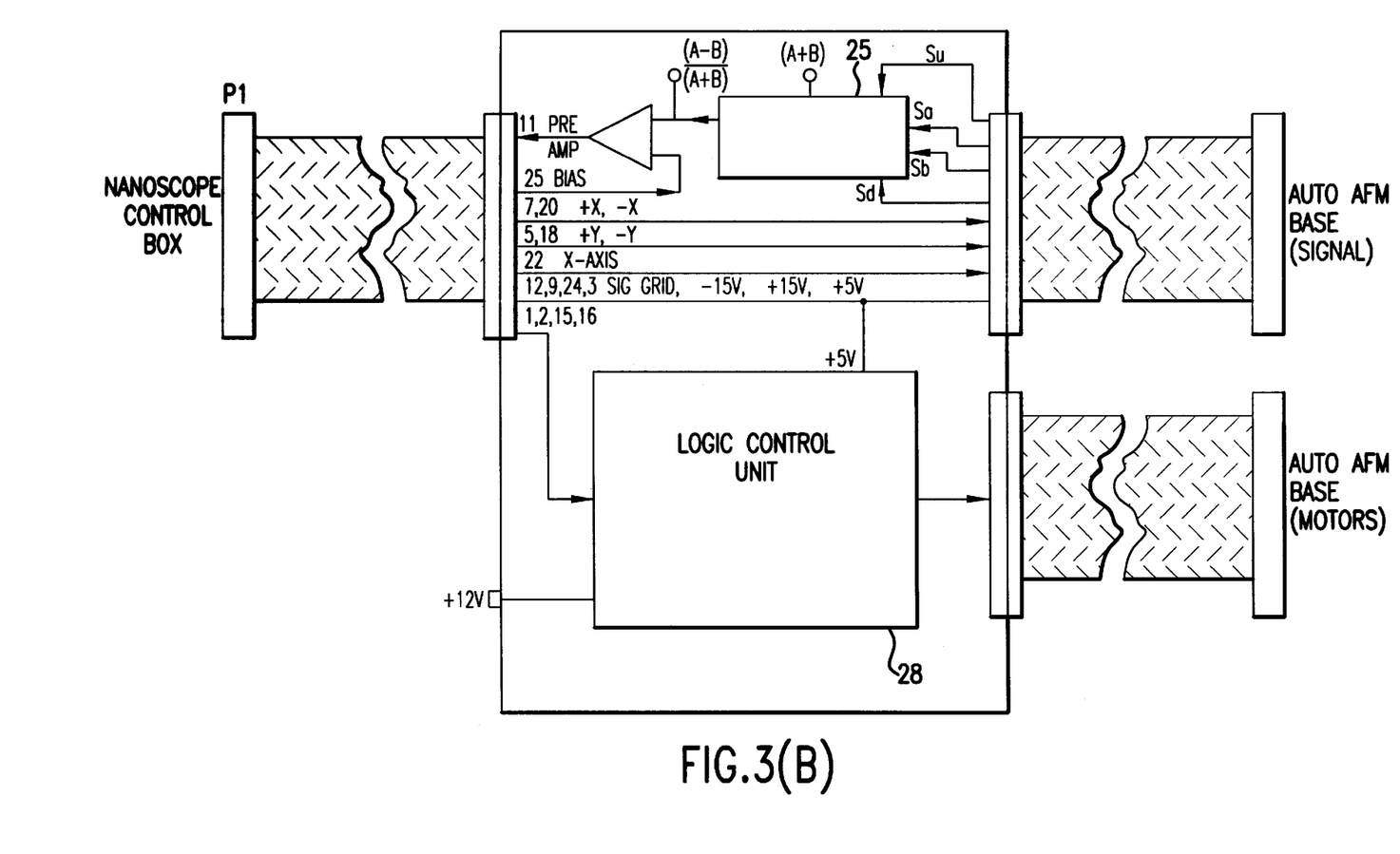
Figure 3C:
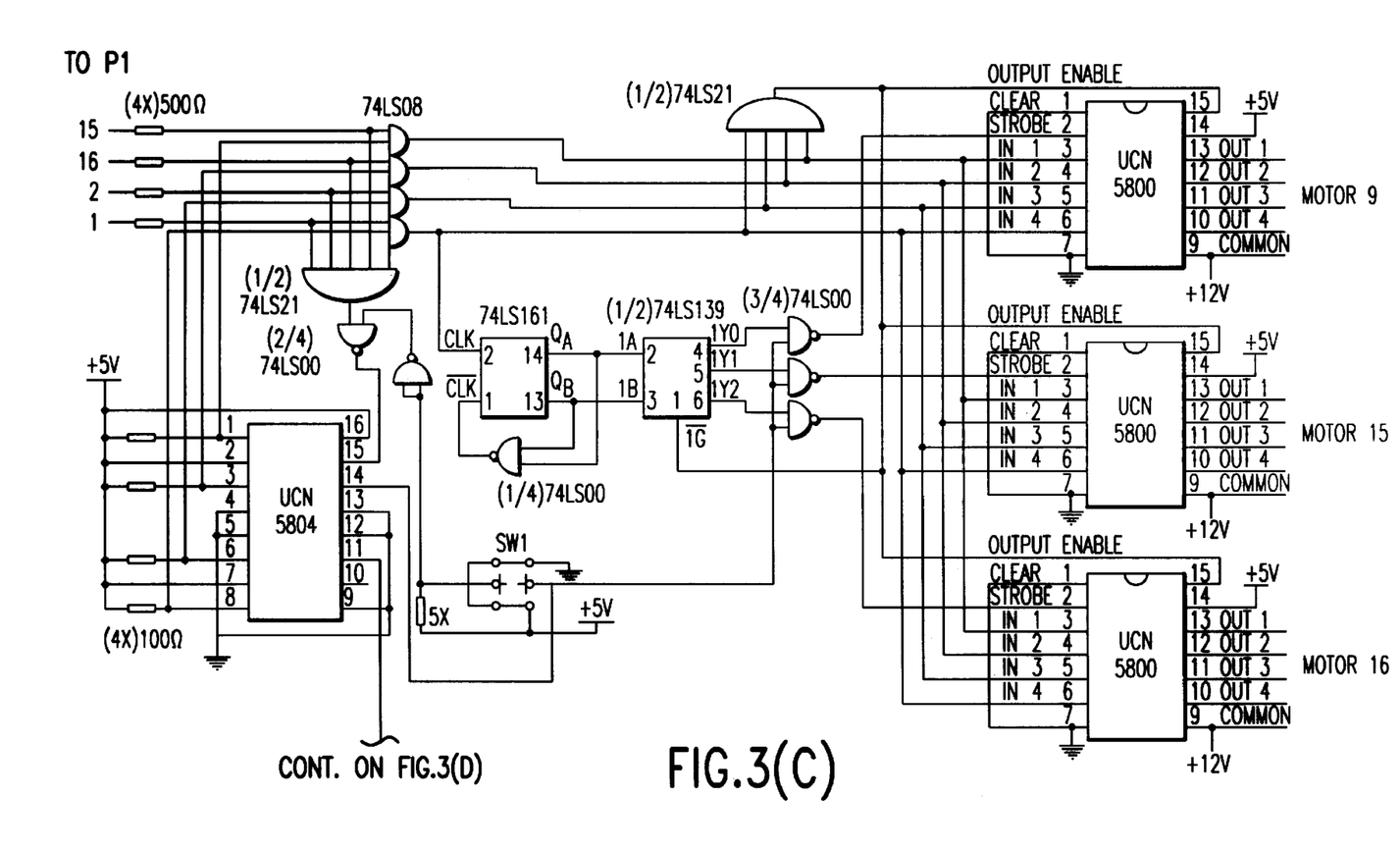
Figure 3D:
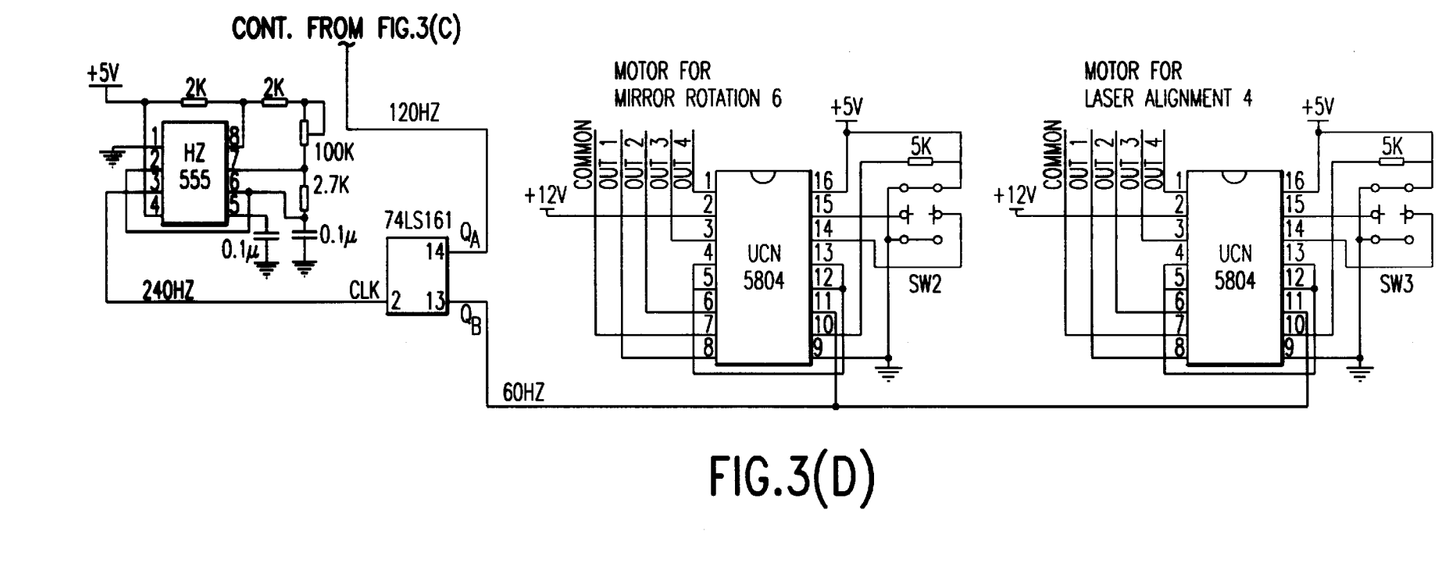

That is, FIG. 2 shows a control circuit 125 which performs the above-described signal processing. FIG. 3(a) shows how the circuit 125 is input to a larger control unit 128, which in turn controls stepper motors 4, 6, 9, 15 and 16, as further discussed below. FIG. 3(b) of the present specification shows how the control circuitry of the present invention can be connected between a NanoScope control box and the automatic atomic force microscope (auto AFM) of the present invention. FIG. 3(c) shows a partial specific circuit diagram of circuitry used in achieving the objectives of the present invention. One of the ordinary skill in the art would recognize that other specific circuitry could be utilized.

In one operation of the present invention, as discussed in further detail below, the mirror 5 can be adjusted so that the reflected fine line laser beam from cantilever 3 properly impinges on the high sensitivity detector 7. The detectors 11, 12 can be utilized to control an adjustment of the positioning of rotating mirror 5.

A specimen to be evaluated is mounted magnetically to a piezotube scanner 8, and a tip-sample approach operation is achieved by stepper motors 9, 15, 16 which respectively control driven screws 10, 17 and 18, as discussed in further detail below.

The rotating mirror 5 may be adjusted with a long lever that slides on a Teflon block to reduce friction. An 80 pitch/inch screw as screw 14 may be used to move the Teflon block up and down, coupled to stepper motor 6 which may be a 15° stepper motor (Airpax, NB82115-M3) with a 1:4 reduction. The dimensions of the system may be determined such that a per step turn of stepper motor 6 corresponds to 0.004° mirror rotation, which is roughly 2 $\mu$m linear movement of the reflected laser beam on the detector 7, sufficient for adjustment in the Sa−b, Sa+b signals to the third digit. The total adjustment range is about 20°. A similar design may also be used for the adjustment of the laser beam tilting. Per step of the stepper motor 4 may correspond to 1.5 $\mu$m in laser beam movement at the cantilever position. In the laser assembly, the output aperture of the cylindrical lens 2 may be about 3 mm, and the cantilever 3 may be situated at the focal plane of the cylindrical lens 2. To ensure a proper beam shape, the orientation of the laser generating source 1 must be adjusted so that the divergent direction is perpendicular to the cantilever 3. Before approach, an operator needs to level the AFM head. The distance between the tip 20 and the specimen surface can be many mm away.

Such an atomic force microscope according to the present invention can provide an operation as discussed below which can reduce operator errors, and which can provide a convenient imaging, particularly of specimens in aqueous solutions.

More particular, in a background atomic force microscope a movement of a cantilever by optical detection is widely used and has been successful. The most common design is to focus a laser beam from a laser diode into a small spot. For in air operations, with the aid of a low power light microscope, this spot laser beam can be properly aligned on an edge or tip of the cantilever, as distinguished from a tip 20 to contact a speciman, by an experienced operator. However, lateral alignment is often more difficult, because the best location for the laser spot is at the very end of edge or tip of the cantilever, which is typically only about 10 $\mu$m wide.

Further, when a specimen in a fluid cell is used, the laser beam must be focused through a plastic cover, which severely distorts the image of the cantilever. As a result, inexperienced operators often cannot properly focus the laser beam spot on the tip of the cantilever.

Moreover, if the background atomic force microscope is to be utilized in a dark, sealed, vacuum and/or temperature controlled environment, it may not be possible to utilize a lower power light microscope, and it may also require the operator not being allowed to come close to the atomic force microscope to make the required manual adjustments.

Another drawback with such a background atomic force microscope is that after the small spot laser beam is properly focused onto the cantilever, the speciman tip supported by the cantilever must then be lowered while still being level and to just above a surface of the specimen. This operation is also done manually in the background atomic force microscope. This manual operation also requires operator experience, because if the operator lowers the cantilever to the specimen too quickly, i.e., if a tip crash results, both the specimen and the tip of the cantilever may be severely damaged.

The present invention overcomes the drawbacks in such a background atomic force microscope by making the positioning of the laser beam onto the cantilever 3 automatic, by making the signal of the laser beam reflecting off the cantilever 3 automatically focus on a fixed high sensitivity detector 7, and by also making the lowering of the tip 20 to the specimen automatic. Therefore, the present invention overcomes the drawbacks in the background atomic force microscope with a design which requires only an automatic operation.

Since the cantilever chip itself is typically only about 2 mm wide, and all the cantilevers on its edge are confined in this space, lateral alignment can become unnecessary if the laser beam is sufficiently broad. For the purpose of detecting cantilever deflection, the shape of the laser beam is relatively unimportant. As a result, in the present invention a spot laser beam is not utilized to focus on cantilever 3, but instead a fine line laser beam is generated. To achieve a fine line laser beam of a proper width, the present invention relies on collimating cylindrical lens 2 to generate a parallel line beam output from the laser source 1. In the present invention the laser beam is thus focused into a fine line of approximately 2 mm width at the cantilever position by the use of such a cylindrical collimating lens 2.

That is, in the background atomic force microscope, a laser beam spot is required to be focused onto an edge or tip of a cantilever. Since the laser beam is formed as a spot, positioning such a laser beam spot on the edge or tip of a cantilever requires proper positioning in both X and Y directions. The present invention has as one feature to simplify such a positioning operation.

More particularly, in the present invention a collimating cylindrical lens 2 is provided so that an output from laser beam source 1 is formed as a fine line laser beam. In the present invention this fine line laser beam is swept towards the cantilever 3, and since a fine line laser beam is provided, positioning is only required in one dimension. That is, the positioning operation in the present invention is simplified by generating a laser beam as a fine line which is swept toward the cantilever 3, versus generating a spot laser beam which must thereby be positioned in two directions to properly focus on the edge or tip of the cantilever 3. The cylindrical collimating lens 2 may typically have a focal length of approximately 25 mm with the line focus perpendicular to a longitudinal direction of the cantilever 3. In this design, the laser beam source 1 only needs to tilt in one direction since a fine line laser beam is generated.

In one operation of the present invention, the generated fine line laser beam is first moved away from the cantilever 3, and then the laser beam is slowly brought toward the cantilever 3 by an operation of stepper motor 4 until a reflection of the line laser beam off of an edge or tip of cantilever 3 is detected at the fixed detectors 7, 11, 12. Then stepper motor 4 is stopped. To recover the loss of light intensity required for a reasonable signal to noise ratio, as an example a 20 mW diode as the laser generating source can be used, for example a diode TOLD9140 by Toshiba, rather than a conventional 3–5 mW laser diode.

Figure 4:
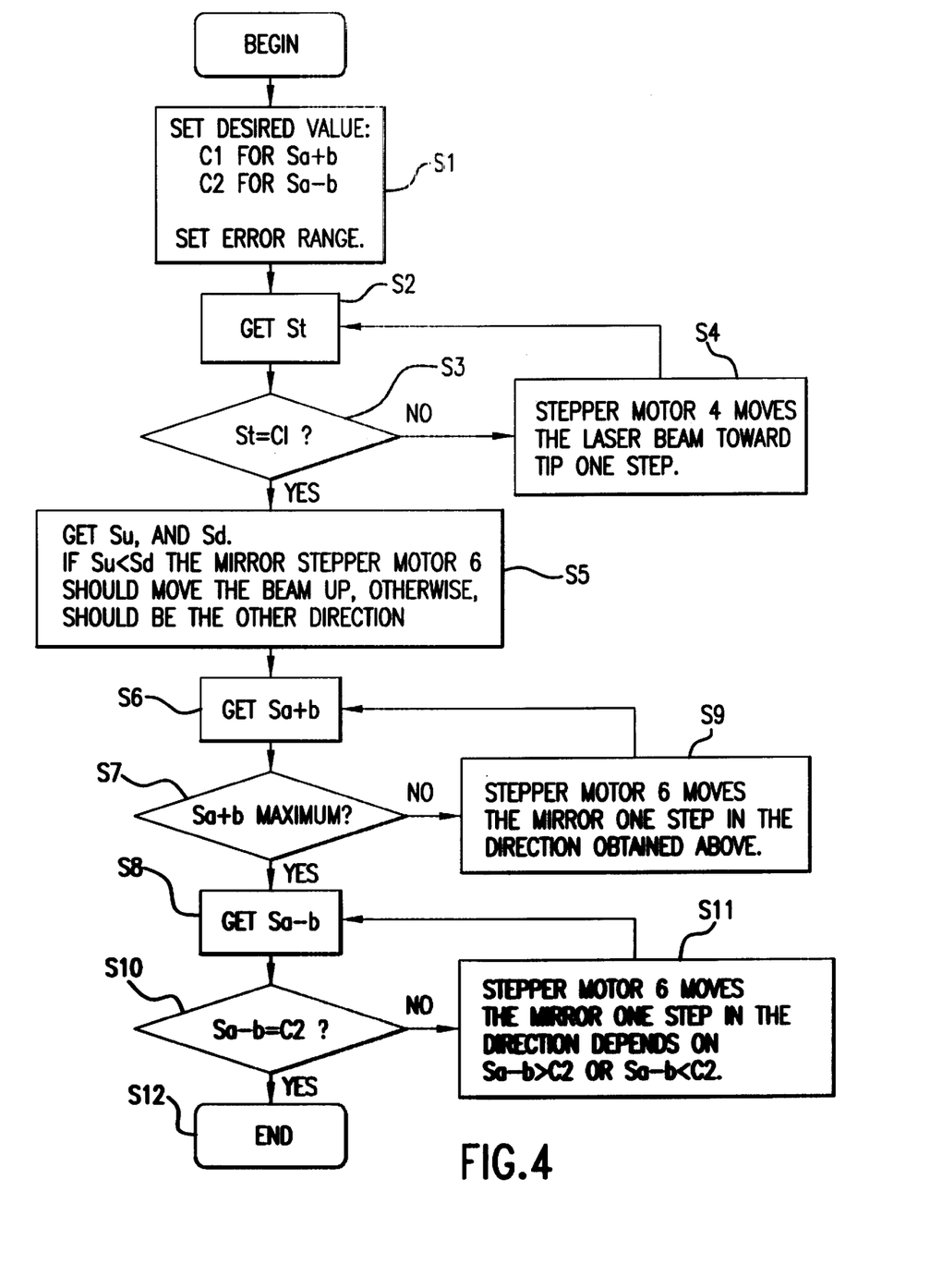
FIG. 4 shows a flowchart of control operations in the present invention.

This operation in the present invention can ensure that the fine line laser beam is properly positioned on the cantilever 3. This operation in the present invention can be made automatic in the following manner, as shown in FIG. 4.

In a first step S1, an operator sets desired values C1 for Sa+b and C2 for Sa−b, and the operator sets an error range; that is the operator sets a desired signal strength of the laser beam reflecting off cantilever 3. After this initial setting, in step S2 the signal St, indicating a total of the signals received at detectors 7, 11, 12, is determined. In a next step S3 it is determined whether the signal St equals C1; that is, it is determined whether an adequate signal is picked up at detectors 7, 11, 12, indicating that the fine line laser beam is reflecting off cantilever 3. If YES in step S3, indicating the fine line laser beam is focused on cantilever 3, the system then proceeds to step S5. If NO in step S3, indicating the laser beam is not yet focused on tip 20, the system proceeds to step S4 in which stepper motor 4 drives by one step to drive screw 13 to thereby scan the fine line laser beam toward cantilever 3. The system then proceeds to step S2 again.

In this operation of the present invention, the stepper motor 4 initially drives the screw 13 so that the laser source 1 pivots about laser point 11 by moving the screw 13 upwards. This results in the fine line laser beam output through collimating lens 2 to be off to the side of the cantilever 3. Then, in the present invention the stepper motor 5 rotates the screw 13 downwards at each step S4, so that the fine line laser beam gradually scans as a line laser beam towards the cantilever 3. When the fine line laser beam reaches an edge or tip of the cantilever 3, the fine line laser beam reflects off the edge or tip of the cantilever 3, this reflected light then reflects off mirror 5 and impinges on detectors 7, 11, 12. At this time these detectors 7, 11, 12 output a signal St equal to C1, i.e., YES in step S3, and stepper motor 4 stops moving screw 13 so that the laser source 1 is then fixed. At this time the laser source 1 is properly focused on the cantilever 3.

As discussed above, conventionally this operation in the background atomic force microscope would be performed completely manually. The present invention allows such an operation to be performed automatically.

In the embodiment of the present invention as shown in FIG. 1, high sensitivity detector 7 is flanked on both sides by single element detectors 11, 12. In a further operation of the present invention, it is ensured that the laser beam reflecting off the cantilever 3 impinges on the high sensitivity detector 7. This operation in the present invention is achieved by controlling the positioning of mirror 5 based on the initial detection of the laser beam reflecting off cantilever 3, as discussed in further detail below.

In background atomic force microscope designs, a split diode as a photodetector may be provided to be movable in one or two dimensions, via use of a lens which confines the signal into a narrow line, such as in the NanoScope III. In such a background atomic forced microscope, when a laser beam signal reflects off a cantilever, an operator manually adjusts the positioning of such a split diode photodetector until an adequate signal strength is achieved (i.e., until adequate signals Sa+b, Sa−b are detected) in detecting this reflected laser beam off the cantilever. However, the adjustable range is often limited, and is typically within ±5 mm. Moreover, when a plastic cover of the specimen is changed to a different thickness or a solution in a fluid cell containing a specimen has a different index of refraction or the cantilever has an unusual bend, it often requires the manual adjustment of a mirror in the optical path in order to bring the signal reflecting off the cantilever to the required detector. This manual adjustment is often very difficult.

The present invention has a system to also overcome such drawbacks in the background atomic force microscope. More particularly, in the present invention it may occur that when the fine line laser beam output of collimating lens 2 is just focused on the edge or tip of the cantilever 3, such a laser beam reflects off mirror 5 and may impinge on the single element detectors 11, 12. The present invention provides an operation to adjust the positioning of mirror 5 so that such a reflected laser beam impinges on the high sensitivity detector 7.

More particularly, in the present invention if the fine line laser beam reflecting off the cantilever 3 initially impinges on one of the single element detectors 11, 12, then the present invention has a control so that stepper motor 6 is activated to rotate screw 14. Rotation of screw 14 thereby results in rotation of mirror 5. Mirror 5 can then be properly rotated until the reflected laser beam signal from the cantilever 3 properly impinges on the high sensitivity detector 7.

Figure 5A:
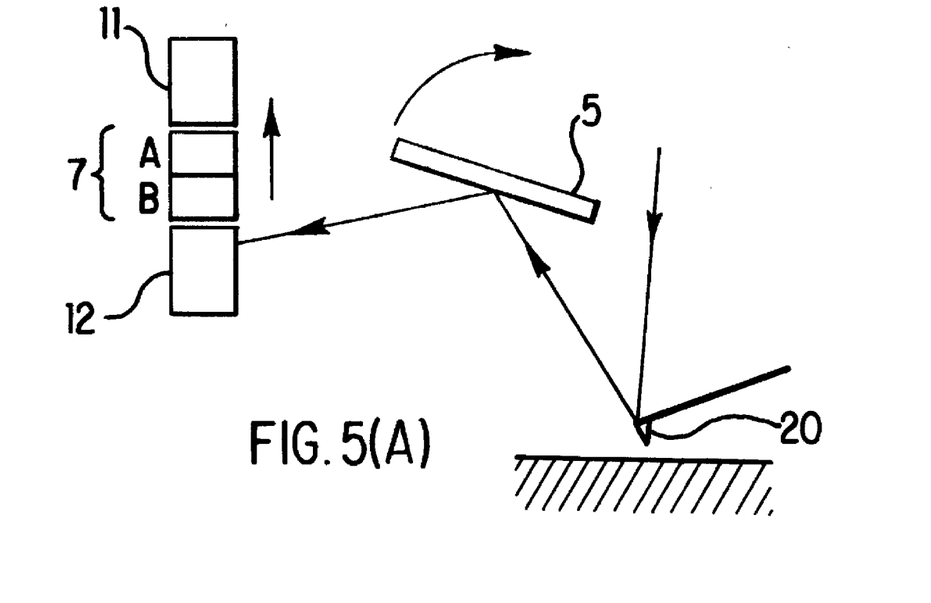
Figure 5B:
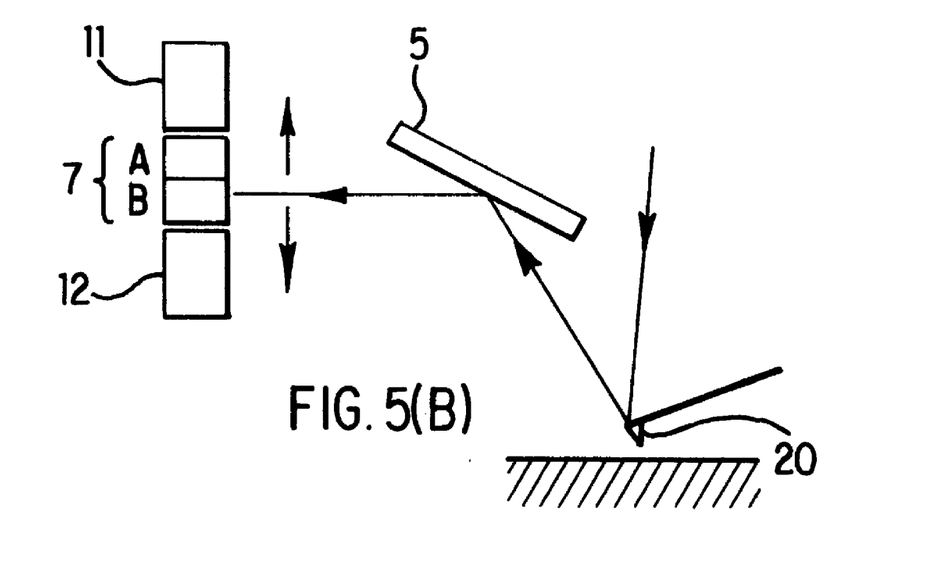

As one specific example, and as shown in FIG. 5(a), assume that when the fine line laser beam reflects off the cantilever 3, that the fine line laser beam reflecting off rotating mirror 5 impinges on the lower single element detector 12. This indicates in the present invention that mirror 5 should be slightly rotated clockwise to effectively raise the position of the reflected laser beam onto the central fixed detector 7. To achieve this operation, the present invention includes a control such that when the lower single element detector 12 initially detects the reflected laser beam signals, the stepper motor 6 rotates screw 14 downward, which thereby results in rotating mirror 5 in a clockwise direction, see FIG. 5(b). When the high sensitivity fixed photodetector 7 then receives the reflected fine line laser beam, then the operation of stepper motor 6 is stopped. In this operation of the present invention, the reflected fine line laser beam from the cantilever 3 can properly impinge on the high sensitivity detector 7.

This operation of the present invention is also shown in steps S5–S12 of FIG. 4 of the present specification. As is shown in FIG. 4, in one embodiment of the present invention after the fine line laser beam is properly focused on the cantilever 3 in step S4, then adjustment of the mirror 5 to ensure that the reflected light properly impinges on the fixed high sensitivity detector 7 can be effectuated.

In step S5, the signals Su and Sd are obtained indicating whether the fine line laser beam initially reflecting off the cantilever 3 impinges on either one of the upper detector 11 or lower detector 12. If the signal Su is less than Sd, indicating that the light impinges on the lower detector 12, see also the example shown in FIG. 5(a) of the present specification, then the stepper motor 6 should rotate mirror 5 slightly clockwise, see again FIGS. 5(a) and 5(b) of the present specification.

Then in a step S6, the value Sa+b is obtained and in a step S7 it is determined whether Sa+b is at a maximum. Ideally, the value Sa+b will be at a maximum to indicate proper positioning of the mirror 5, i.e., to indicate that the fine line laser beam reflecting off the cantilever 3 impinges on the fixed high sensitivity detector 7. If it is determined that Sa+Sb is not at a maximum, i.e., NO in step S7, then the stepper motor 6 again rotates mirror 7 one step as indicated in step S9, and the system then returns to step S6.

When it is determined that the signal Sa+b is a maximum in step S7, i.e., YES in step 7, then the system proceeds to determine the value Sa−b in step S8, and the system then proceeds to step S10 to determine whether Sa−b equals the desired value C2. If Sa−Sb does not equal the desired value, i.e., NO in step S10, then the system proceeds to step S11 where the stepper motor 6 drives mirror 5 to be rotated. The system then returns to step S8 where the value Sa−b is again determined. The system proceeds through this cycle until it is determined in step S10 that Sa−b equals the desired value C2, i.e., until YES in step S10. The system then ends in step S12.

The control operation of the present invention shown in FIG. 4 shows control operations to both focus the line laser beam onto the cantilever 3 and to properly rotate mirror 5 until the reflected light properly impinges on fixed high sensitivity detector 7. However, only one of these automatic operations could be implemented in an atomic force microscope. That is, an atomic force microscope can be constructed such that only steps S1–S4 are performed, or such that only steps S5–S11 are performed. In a preferred embodiment of the present invention, both of these automatic operations are performed.

Such processes as shown in FIG. 4 can also be conventionally programmed to compensate for signal drifting, if signal drifting becomes a problem, or to give warning signals to an operator. When a sufficient stability is achieved, an approach can proceed until engagement is completed.

Moreover, to ensure ease of adjustment and sufficient stability, a magnetically coupled pivot may be used to anchor the small surface mirror 5 in place. With this design, because the detector 7 is fixed in position, only one adjustment is needed for this part of the alignment, and the adjustment range is significantly increased in the same space when compared with the background atomic force microscope which utilizes a moving detector. This results because the angle between the incoming and the reflected fine line laser beam is twice that of a rotating angle of the mirror 5, and the linear adjustment range is proportional to the distance between the mirror 5 and the detector 7. The other advantage with the fixed detector 7 in the present invention is that the other detectors 11, 12 can be used above and below the split diode, which can then be used as an autoalignment signal, as discussed above.

As discussed above, with the operation of the present invention, a fine line laser beam can be appropriately positioned onto the tip of the cantilever 3, and the fine laser beam reflected signal can be properly positioned onto a fixed high sensitivity detector 7.

In an operation of an atomic force microscope, after the laser beam is properly positioned on the cantilever 3, the tip 20 must then be lowered to just contact the surface of the specimen. This is accomplished in background atomic force microscopes by an operator manually lowering the position of the head of the atomic force microscope which includes the tip 20 to a distance of about 100 microns above the speciman. As discussed above, the drawback of such background atomic force microscopes is that this manual adjustment requires great operator experience or else a tip crash may result. As another potential drawback in such a manual adjustment, the head of the atomic force microscope must be lowered while still maintaining a level surface. Otherwise, the atomic force microscope head may tilt, which may thereby result in the tip not properly engaging the specimen, or may even result in a loss of fluid from a fluid cell.

However, this manual operation is often difficult and relies heavily on operator experience, because a plastic cover on the specimen may distort the image significantly such that it may be difficult to make a good judgment as to its position.

In the atomic force microscope of the present invention, three symmetrically arranged stepper motors 9, 15, 16 are coupled to three respective advancing screws 10, 17, 18, which are controlled by logic control unit 28 to achieve the movements as discussed further below. In the present invention stepper motors 9, 15, 16 each move by one step in a sequential operation to gradually lower the atomic force microscope head, including the tip 20 thereof, until tip 20 contacts a surface of the specimen. By utilizing a sequential movement of the stepper motors 9, 15, 16 and the advancing screws 10, 17, 18, this ensures that the atomic force microscope head is always level throughout the approach period, regardless of how far the tip 20 is from the specimen surface. The combination of these features can eliminate most operator errors in the operation of the atomic force microscope of the present invention for imaging and solution.

The present invention achieves this further automatic operation by utilizing the three approach stepper motors 9, 15, 16 (e.g. PX243M-03AA, 0.9°/step, Oriental Motor Co., Ltd.) which, as an example, are coupled to 80 pitch/inch precision screws 10, 17, 18 with a 1:2 reduction. The cantilever 3 is placed at a center of the three approach screws 10, 17, 18, so that another 1:3 reduction is achieved. With this structure of the present invention, only a 0.13 micron advancement is made per motor step.

In this operation of the present invention as one example, after the fine line laser beam is properly positioned on the cantilever 3, and the reflected fine line laser beam signal is properly impinging on the fixed high sensitivity detector 7, then the entire head of the atomic force microscope is lowered. In the operation of the present invention, each of stepper motors 9, 15, 16 sequentially moves in, for example, one step increments to thereby lower screws 10, 17 and 18. This operation of the present invention continues until the tip 20 contacts the specimen. The time when tip 20 contacts the specimen is detected because the tip 20 will slightly move after contacting the specimen, which thereby changes the reflection of the fine line laser beam off the cantilever 3, and which in turn changes the signals Sa, Sb output by the detector 7. When this change in signals Sa, Sb is detected, this indicates that tip 20 has contacted the specimen, and then the operation of the stepper motors 9, 15, 16 is stopped.

Figure 6:
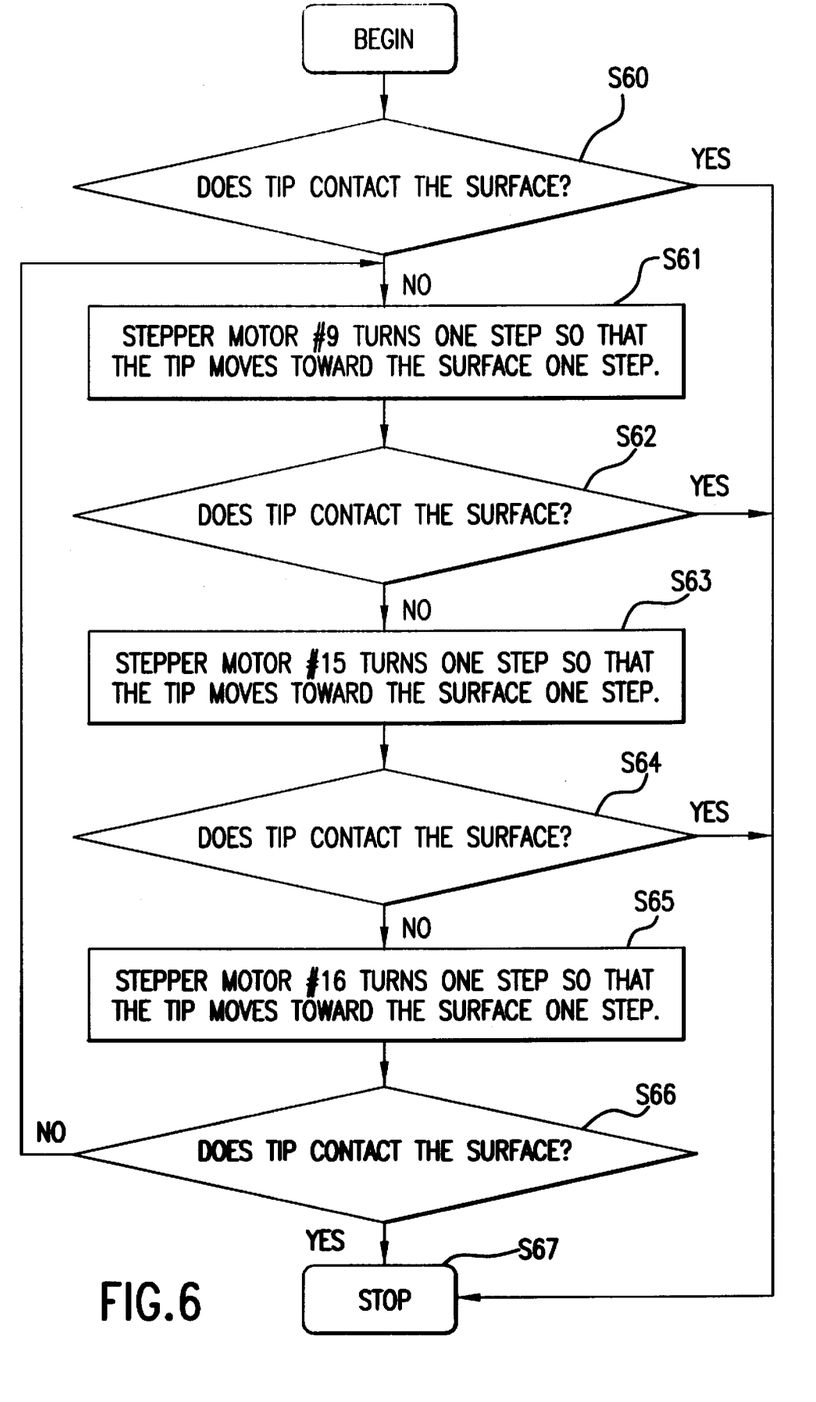
FIG. 6 shows a further control operation in the present invention.

A more specific example of this operation of the present invention is detailed in FIG. 6, in which in a first step S60 it is determined if the tip 20 contacts the specimen. If NO in step S60, this indicates that the head of the atomic force microscope is required to be still lowered, and then the first stepper motor 9 turns one step in step S61, to thereby lower its respective screw 10 a distance corresponding to this one step. At this time the head of the atomic force microscope will be slightly tilted towards screw 10. However, the size of the steps in the stepper motor 9, 15, 16 are chosen such that each step results in only a very slight movement of the corresponding screw, for example on the order of 200 nm, so that this slight tilting is not problematic.

After this first screw 10 is lowered in step S61, if it is determined in step S62 that the tip 20 still does not contact the specimen, i.e., NO in step S62, then the second stepper motor 15 operates to turn one step in step S63 to thereby lower the second screw 17 a distance corresponding to this one step. After the second screw 17 is lowered by the distance corresponding to one step of stepper motor 15 in step S63, if it is determined in step S64 that the tip 20 still does not contact the specimen, i.e., NO in step S64, then the third stepper motor 16 turns one step in step S65 to thereby lower the third screw 18 a distance corresponding to this one step. In step S66 it is again determined whether the tip 20 contacts the surface of the specimen. If NO in step S66, then the system then returns to step S61 and the stepper motor 9 lowering the screw 10 a distance equivalent to turning one further step. The system then proceeds to sequentially operate each of stepper motors 9, 15 and 16 to turn one step to sequentially lower each of respective screws 10, 17 and 18 by one step. This sequential operation of the present invention is continued until the tip 20 contacts the specimen, i.e., until YES in step S66.

This final operation in the present invention allows the atomic force microscope of the present invention to by completely automatic in placing the laser beam onto the cantilever 3 at the appropriate position, and such that an appropriate reflected signal is received at the detector 7, and such that the tip 20 is properly positioned on the specimen.

As discussed above, a specimen to be examined by such an atomic force microscope is typically placed on a piezotube scanner.

Since a piezotube scanner typically has a maximum range of several μm, the sample will be able to retract fully to avoid crashing with the tip upon contact. A piezotube scanner is typically mounted through a ceramic ring to a stainless steel base which is mounted through three Teflon supports on the base in order to reduce mechanical couplings. As discussed above, one drawback in background atomic force microscopes is that the piezotube scanner has four high voltage 90° cylindrical section outer electrodes. If the specimen is in an aqueous solution, any solution leakage contacting these high voltage 90° cylindrical section outer electrodes and may short and permanently damages the piezotube scanner.

Figure 7:
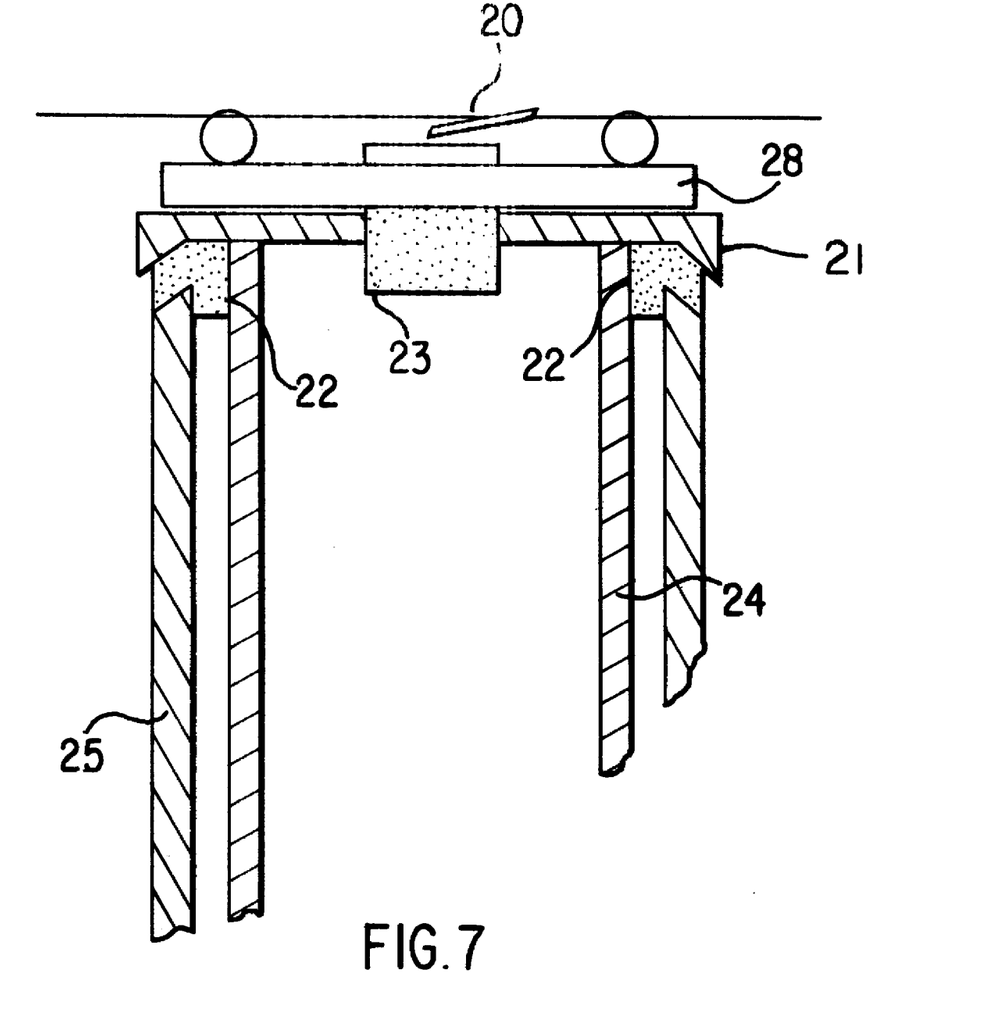
FIG. 7 shows a first piezotube scanner according to the present invention.

To prevent liquid from leaking into the piezotube which would be particularly harmful because of the high voltage (e.g. −440 V) on the electrodes and the salt contained in most buffers (in fact, this has been a frustrating problem in many laboratories in that imaging in solution is often accompanied with fear of instrument breakdowns), in the present invention a novel piezotube scanner structure is provided such that the piezotube scanner is sealed inside a protective sleeve, as shown in FIG. 7.

The device as shown in FIG. 7 of the present specification shows a specially designed piezotube scanner of the present invention. As shown in FIG. 7, outer high voltage piezo electrodes 24 are provided. Internal to these electrodes 24 is a magnet 22 to secure a mounting of a specimen. In this feature of the present invention, an aluminum cover 21 is provided outside of the electrodes 24, and silicone rubber seals 22 are provided between the electrodes 24 and this aluminum cover 21. Further, a stainless steel sleeve 25 is provided outside of the electrodes 24, and seals 22 extend between the aluminum cover 21 and this stainless steel sleeve 25.

In this construction of the present invention, a holding plate 28 is provided to hold a specimen, and this holding plate 28 can be made to be slightly larger than the inner diameter of the stainless steel sleeve 25, which is tapered inward at its end. The silicon rubber seals 22 are then used to seal all the joints to ensure sufficient flexibility. Therefore, scanning is not affected by the sealing material. It should be mentioned that due to the high frequency movement of the electrodes 24, the seals 23 often have cracks over time. In this design, such cracks are unlikely to lead any solution to the electrodes 24. This design of the piezotube scanner of the present invention protects electrodes 24 from any solution leakage.

Figure 8:
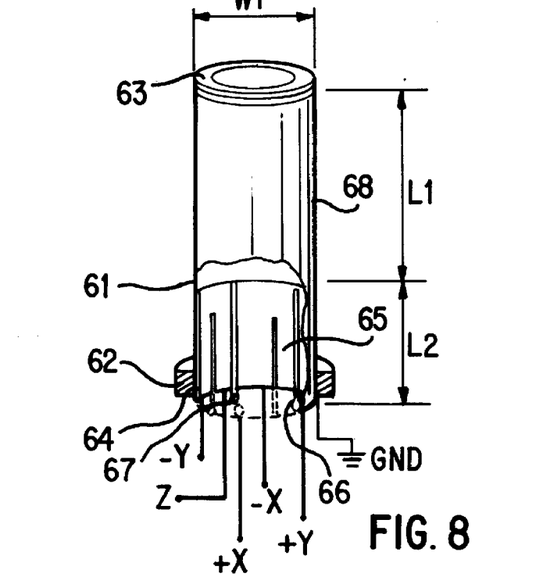
FIG. 8 shows a second piezotube scanner according to the present invention.
Figure 9:
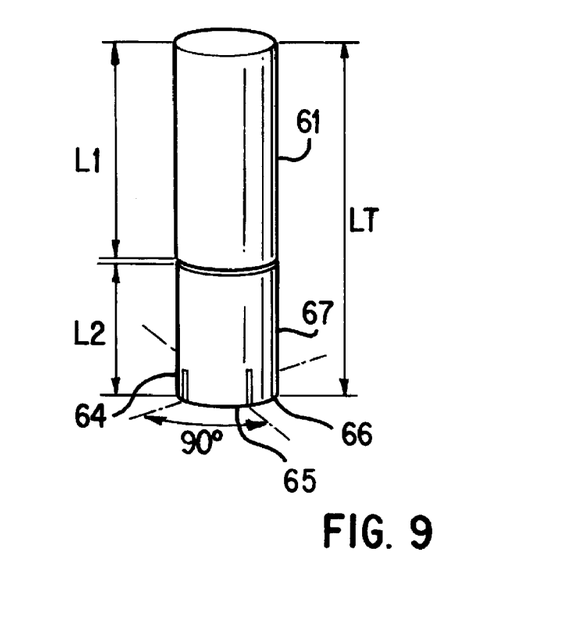
FIG. 9 shows a specific structure of the piezotube scanner of FIG. 8.

As a further feature of the present invention, a novel piezotube scanner structure can be provided as shown in FIGS. 8 and 9 such that even if there is leakage of an aqueous solution containing a specimen, such a leakage will not damage the piezotube scanner. FIG. 8 shows a complete piezotube scanner according to this embodiment, and FIG. 9 only shows a structure of inner electrodes of this piezotube scanner.

As discussed above, the conventional piezotube scanner includes four 90° cylindrical section outer electrodes and one solid inner electrode. The outer electrodes have a high voltage applied thereto. The drawback with this system is that any liquid which contacts the outer electrodes, by virtue of their being at a high voltage, may short the piezotube scanner, and thereby permanently damage the piezotube scanner.

In the present invention a novel piezotube scanner is provided as shown in FIGS. 8 and 9. An outer electrode 68 is provided, and this outer electrode 68 is a single solid outer electrode. Further, in the present invention this outer electrode 68 is grounded. This piezotube scanner also includes specimen plate 63 and ceramic mount 62.

Moreover, in this structure of the piezotube scanner of the present invention, four partial inner electrodes 64–67 are provided. These four inner electrodes 64–67 are divided into 90° cylindrical sections, and these inner electrodes 64–67 are provided to perform both x and y movements. These partial inner electrodes 64–67 extend a distance L2 in length. Further, a 360 degree inner electrode 61 is also provided which extends a distance L1. FIG. 9 shows just these inner electrodes 61 and 64–67.

In the structure of the present invention, the overall electrode is divided into essentially two length section and the first length section of the 360 inner electrode 61 has a length L1 and the second length section of the inner electrodes 64–67 has a length L2. The inner electrode 61 having a length L1 primarily performs movement in a Z direction. The lower electrodes 64–67 divided into the four 90° segments provide X and Y movements.

As noted above, the outer electrode 68 is grounded, and high-voltage signals are applied only to the inner electrodes 61 and 64–67. With this structure in the present invention, as the outer electrode 68 is grounded, any solution leakage on this outer electrode 68 will not short out the electrodes, and thereby damage the piezotube scanner.

As one specific example of this embodiment of the present invention, when a thickness of the wall of this piezotube scanner is 0.03 inches and the piezoelectric material used is EBL3 (Stavely Sensors, Inc.), and if the piezotube scanner is made so that L1 equals 1 inch and L2 equals 0.75 inches, a scan range of 15 μm laterally and 3.6 μm vertically can be achieved. To avoid leakage of fluid inside of the piezotube scanner, the magnetic sample mount 63 can be epoxied to an end of the piezotube scanner and an opening between the piezotube scanner and a protective sleeve, if provided, may be sealed with silicone rubber, as shown for example in FIG. 7, to further reduce any chance of leakage.

Figure 10A:
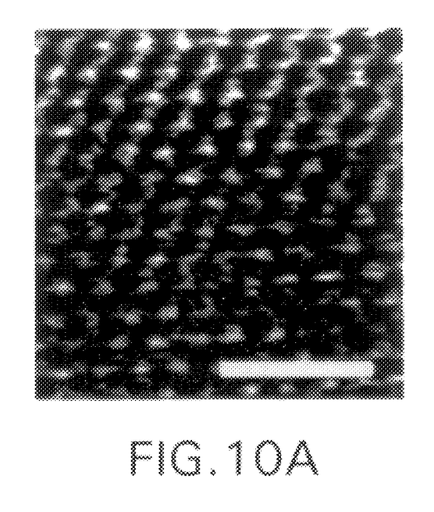
Figure 10B:
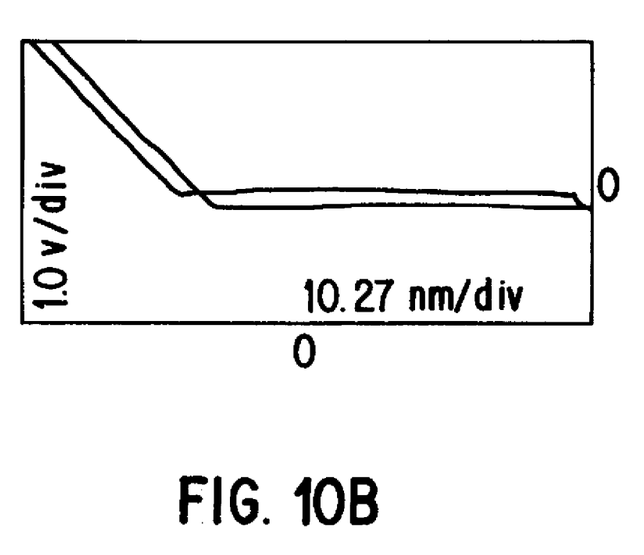
Figure 10C:
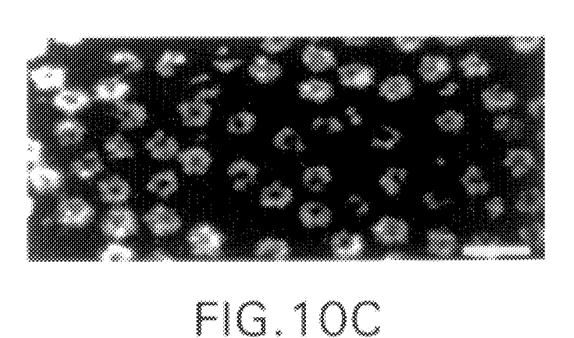

In testing the system described above utilizing the control operations of FIGS. 4 and 6, the complete system showed excellent mechanical stability and vibration isolation. This performance was demonstrated by atomic resolution images obtained on crystalline specimens. In FIG. 10(a), an image of mica is shown where the 0.5 nm lattice is well resolved. To have such performance, the system needs only to be suspended from a spring loaded heavy plate. In FIG. 10(b), a force curve is shown (obtained on mica surface in deionized water). These results demonstrate that the ideas discussed above are practical and indeed simplified operational procedures of an AFM. No mechanical complications were introduced by couplings of motors 4, 6, 9, 15, 16 to in any way degrade the instrument performance. The system was further tested for its performance in imaging biological specimens under aqueous buffers and the system performed equally well. In FIG. 10(c), an AFM image of the cholera toxin B oligomer adsorbed onto a mica surface in 20 mM NaCl is shown. The operation of this the present invention was much easier, and the demand on operator skills was greatly reduced, in comparison with background atomic force microscopes.

In summary, by the present invention an improved AFM can be fully automatic in operation. Experimental results have verified the validity of these novel designs, and demonstrated that operation under aqueous buffers can be much easier than in background atomic force microscopes.

Further, these new functions as discussed above are relatively simple to adopt on any existing platform. Such an atomic force microscope of the present invention could also be designed to be housed in a temperature controlled chamber which can be achieved by a couple of small Peltiers devices or simply in a table top refrigerator. Since no manual adjustment of the system is necessary, except the change of cantilevers, such an extension is straightforward, and the temperature can be controlled through a simple feedback circuitry with the use of temperature sensors located in the fluid cell itself. Similar features can also be incorporated in a cryo-AFM or an AFM in a vacuum chamber where complete remote control is almost a necessity, which can make the atomic force microscope of the present invention more robust for routine experiments.

Embodiments of the present invention also provide a novel seal structure and a novel piezotube scanner structure so that any leakage from a specimen does not contact any high voltage electrodes.

Obviously, numerous additional modifications and variations of the present invention are possible in view of the present teachings. It is therefore to be understood that within the scope of the appended claims, the present invention may be practiced otherwise and as specifically described herein.

What is claimed as new and desired to be secured by Letters Patent of the United States is:

1. An atomic force microscope including a tip supported on a cantilever, comprising:
    a laser source formed about a pivot point for outputting an output laser beam;
    a cylindrical lens for forming the output laser beam into a line laser beam;
    a first stepper motor to move the laser source about the pivot to cause the line laser beam to scan;
    a controller for controlling the first stepper motor to cause the line laser beam to scan to focus on and reflect off the cantilever;
    a mirror for reflecting the line laser beam reflecting off the cantilever toward a first fixed detector;
    a second stepper motor for controlling a rotation angle of the mirror, wherein the controller controls the second stepper motor to align the rotation angle of the mirror to reflect the line laser beam reflecting off the cantilever to focus on the first fixed detector; and
    a plurality of third stepper motors for driving respective driven screws to lower the tip to a specimen, wherein the controller controls the plurality of third stepper motors to sequentially step in fixed step increments to lower the tip to the specimen.

2. The atomic force microscope according to claim 1, further comprising second and third fixed detectors formed on opposite sides of the first fixed detector, wherein the controller controls the rotation angle of the mirror based on outputs of the second and third fixed detectors.

3. The atomic force microscope according to claim 1, wherein the plurality of third stepper motors comprises at least three stepper motors.

4. The atomic force microscope according to claim 1, further comprising a piezotube scanner on which the specimen is mounted, the piezotube scanner comprising:
    an electrode having predetermined voltages applied thereto;
    a protective sleeve surrounding the electrode;
    a cover formed to cover said electrode and said protective sleeve; and
    a sealing material formed between the electrode and the protective sleeve and between the cover and the protective sleeve.

5. The piezotube scanner according to claim 4, wherein the protective sleeve comprises stainless steel.

6. The piezotube scanner according to claim 4, wherein the sealing material comprises silicone rubber.

7. The atomic force microscope according to claim 1, further comprising a piezotube scanner on which the specimen is mounted, the piezotube scanner comprising:
    a plurality of inner electrodes having predetermined voltages applied thereto;
    an outer electrode formed around the plurality of inner electrodes, the outer electrode being connected to ground.

8. The piezotube scanner according to claim 7, wherein the plurality of inner electrodes comprises a 360° inner electrode for controlling movement in a z direction and four 90° cylindrical section inner electrodes for controlling movement in x and y directions.

9. An atomic force microscope including a tip supported on a cantilever, comprising:
    a laser source formed about a pivot point for outputting a laser beam;
    a cylindrical lens for forming the output laser beam into an output line laser beam;
    a stepper motor to move the laser source about the pivot to cause the line laser beam to scan; and
    a controller for controlling the stepper motor to cause the line laser beam to scan to focus on and reflect off the cantilever.

10. An atomic force microscope generating a laser beam to focus on and reflect off a cantilever toward a fixed detector, comprising:
    a mirror for reflecting the line laser beam reflecting off the cantilever toward the fixed detector;
    a stepper motor for controlling a rotation angle of the mirror; and
    a controller for controlling the stepper motor to align the rotation angle of the mirror to reflect the line laser beam reflecting off the cantilever to focus on the fixed detector.

* * * * *